United States Patent [19]
Ray et al.

[11] Patent Number: 6,004,595
[45] Date of Patent: Dec. 21, 1999

[54] REFRIGERATED BISCUIT DOUGH PRODUCT WITH TOPPING AND METHOD OF MANUFACTURE

[75] Inventors: Madonna M. Ray, Vadnais Heights; Jean Zoborowski, St. Louis Park; Shahed Zaman, Roseville, all of Minn.

[73] Assignee: The Pillsbury Company, Minneapolis, Minn.

[21] Appl. No.: 08/416,444

[22] Filed: Apr. 3, 1995

Related U.S. Application Data

[63] Continuation of application No. 08/100,700, Jul. 30, 1993, abandoned, which is a continuation of application No. 07/827,122, Jan. 28, 1992, abandoned.

[51] Int. Cl.⁶ .................................................. A21D 10/02
[52] U.S. Cl. ......................... 426/94; 426/128; 426/289; 426/295; 426/496; 118/13; 118/16; 118/18
[58] Field of Search ............................ 426/94, 295, 289, 426/502, 128, 496; 425/335; 118/13, 16, 18

[56] References Cited

U.S. PATENT DOCUMENTS

| | | | |
|---|---|---|---|
| 2,998,318 | 8/1961 | Forkner | 426/275 |
| 3,070,264 | 12/1962 | La Mar Christy | 222/227 |
| 3,073,607 | 1/1963 | La Mar Christy | 275/14 |
| 3,427,783 | 2/1969 | Reid . | |
| 3,458,970 | 8/1969 | Reid et al. | 53/159 |
| 3,593,676 | 7/1971 | Reid et al. | 107/12 |
| 4,266,502 | 5/1981 | Monaco | 118/18 |
| 4,381,315 | 4/1983 | Yong et al. | 426/94 |
| 4,738,859 | 4/1988 | Kenneally | 426/289 |
| 4,741,916 | 5/1988 | Heidel et al. | 426/94 |
| 4,778,365 | 10/1988 | Archer | 425/73 |
| 5,247,782 | 9/1993 | Rejsa . | |

FOREIGN PATENT DOCUMENTS 0046159   2/1982   European Pat. Off. .

OTHER PUBLICATIONS

Samuel A. Matz, PH.D., Equipment for Bakers, Pan–Tech International, Inc., McAllen, Texas, 1988; pp. 239–242, 427–429, 435–436.

*Primary Examiner*—Lien Tran
*Attorney, Agent, or Firm*—Merchant, Gould,Smith, Edell, Welter & Schmidt

[57] ABSTRACT

A method for applying and embedding dry toppings to both rolled and biscuit-like dough products and the resulting dough piece of the method. The method includes applying dry toppings on the surface of the dough product in a sheeting line. Then, the roll pairs in the sheeting line embed the dry toppings into the surface of the dough product.

12 Claims, 1 Drawing Sheet

REFRIGERATED BISCUIT DOUGH PRODUCT WITH TOPPING AND METHOD OF MANUFACTURE

CROSS-REFERENCE TO RELATED APPLICATIONS

The present application, U.S. Ser. No. 08/416,444, filed Apr. 3, 1995, is a continuation of U.S. Ser. No. 08/100,700, filed Jul. 30, 1993 now abandoned, which is continutation of U.S. Ser. No. 07/827,122, filed Jan. 28, 1992 now abandoned.

BACKGROUND OF THE INVENTION

The present invention relates to refrigerated dough products. Specifically, the invention discloses a novel method for applying dry toppings to the surface of refrigerated dough products and the resulting dough piece of the method.

For many years, customers have enjoyed the convenience of packaged dough products. These dough products are commonly stored under normal refrigeration until the package is opened for baking. Over the years, the industry has developed a variety of different dough products suitable for packaging. Some popular dough products are breadstuffs, biscuits, and sweet goods.

The processing and packaging methods differ for different types of dough products. Two common types of dough products are rolled and biscuit-like products. "Rolled dough products" are dough products which are sheeted, cut into rectangular pieces, rolled into cylindrical shapes, and then slid into a container. Conversely, "biscuit-like dough products" are sheeted, cut into circular type pieces (e.g. hexagonal), and then a vacuum/pressure plunger holds and releases the biscuit-like individual pieces (e.g. eight) into a container.

FIG. 1 illustrates a typical processing method for both rolled and biscuit-like products. First, a dough mass is prepared 10. Next, the prepared dough mass travels through a sheeting line 12. The sheeting line 12 rolls the dough mass into a dough sheet of uniform thickness.

FIG. 2 is a schematic diagram of a typical sheeting line for both rolled and biscuit-like dough products. The sheeting line consists of a plurality of roll stands 16. Each roll stand 16 consists of a plurality of vertically spaced roll pairs 17. Each roll pair is spaced closer together than the preceding roll pair. The progressive narrowing of the space between the roll pairs reduces the thickness of the dough sheet. Ultimately, once the dough proceeds through all the roll stands, a uniform dough sheet is made.

U.S. Pat. No. 3,593,676 discloses an example of a dough sheeting apparatus and is incorporated herein by reference.

Returning to FIG. 1, the uniform dough sheet is then cut 14 into individual dough pieces. The cutting step 14 differs for rolled and biscuit-like products. Prior to rolling, the rolled products are cut with the use of cutter rolls. A cutter roll is essentially a roll with a plurality of blades positioned thereon. As the dough travels on a conveyor, cutter rolls cut the dough sheet both longitudinally and transversely into evenly rectangular pieces. The dough sheet may also be perforated or slitted with perforator or slitter rolls.

Unlike rolled dough products, biscuit-like dough products are cut into dough pieces with the use of a cutter unit. The cutter unit has a plurality of openings defining a grid work. U.S. Pat. No. 3,427,783 discloses a cutter unit in which the openings have straight side walls and are preferably hexagonal in cross section. This patent is incorporated herein by reference. With the further use of a movable member, such as a roll, the dough sheet is pressed into the openings. The upper edge of the openings are adapted to cut the dough sheet into numerous dough pieces. Lastly, a compression means retains the dough pieces within the openings until the pieces are to be packed into a container.

After the dough sheet has been cut 14, the individual dough pieces are packaged 15. The packaging step 15 for the rolled dough products differs from that of the biscuit-like dough products. For rolled dough products, after the dough sheet is cut into rectangular pieces, the pieces are rolled into cylindrical shapes on a conveyor belt. The pieces of dough cylinders then fall into a series of loading spoons. Finally, the spoons are tipped to slide the dough pieces into containers aligned with the ends of the spoons.

U.S. Pat. No. 3,458,970 discloses an example of a dough packing apparatus for rolled dough products. This patent is incorporated herein by reference.

With biscuit-like dough products, plungers hold and release the individual dough pieces into containers. Either vacuum or pressure is supplied to the plungers to facilitate the holding and releasing of the dough pieces. When vacuum is supplied, a plunger holds a dough piece momentarily until the receiving container is positioned directly below the dough pieces. The plunger then lowers the dough piece into a container. The vacuum is released, and an air burst assures that the dough piece drops from the plunger tip into the container positioned beneath the cutter unit. The plunger prevents damage to the dough pieces or loss resulting from the dough pieces prematurely falling from the openings.

More recently, dry toppings have been added to various refrigerated dough products. The dry toppings add to the flavor and appearance of the traditional dough products. The type of dry toppings used directly depend on the selected dough product.

In the past, dry toppings were only added to rolled dough products. Common examples of rolled dough products are dinner rolls, danish rolls, and breadsticks. Dry toppings were commonly applied after the last roll stand, when the dough was fully sheeted. The sheeted dough would be cut, the dry toppings were applied, and then the dough pieces were rolled into cylindrical shapes. To maintain an even distribution of dry topping on the dough product, the selected dry toppings had to stick well to the floured dough handled on line. Thus, the only suitable dry toppings were fine and granular in nature.

Expanding to new varieties of dry toppings to be applied on the rolled dough products provided a problem. Dry toppings such as cracked wheat or rolled oats acted differently from the previous dry toppings handled on line. These dry toppings do not adhere well to the floured dough surface. As a result, two common problems occurred during the production process. First, the dry toppings would move towards the center of the dough product during the subsequent rolling process, producing a dough piece with patches of dry topping. Second, the dry toppings would easily fall off during the subsequent rolling, producing a dough piece with scarce amount of dry topping. Thus, dry toppings which did not readily adhere to the floured dough surface would not be evenly distributed on the surface of the rolled dough product.

Unlike the rolled dough products, the packing methods for biscuit-like dough products prevented the application of dry toppings after the dough was fully sheeted. Naturally, biscuits are a common example of a biscuit-like dough product. As described above, the packing method incorporates a plunger which holds the biscuits and releases them into a container. If the dry toppings were added after the sheeting line, as done with rolled dough products, it was thought the vacuum in the plunger would pull the topping off, thereby clogging the plunger and dropping the biscuit. Accordingly, prior to the present invention, dry toppings were not applied to biscuit-like dough products.

In sum, two problems were present with the prior methods. First, although dry toppings could be added to rolled dough products, the prior methods limited the varieties of dry toppings. Dry toppings which did not readily adhere to the floured dough surface were often sparsely distributed and resulted in a dough piece with patches of dry topping. Second, due to the packing method for biscuit-like dough products, dry toppings could not be added to biscuit-like dough products.

The present invention solves the dry topping problem for both rolled and biscuit-like dough products. Unexpectedly, applying and embedding a dry topping on the dough product produces a dough piece with evenly distributed dry topping. The novel embedding method of the present invention expands the variety of suitable dry toppings for rolled dough products. In addition, the invention teaches a method of applying dry toppings to biscuit-like dough products, which was impossible with prior methods.

SUMMARY OF THE INVENTION

The present invention discloses a method for applying dry toppings to both rolled and biscuit-like refrigerated dough products. The novel method involves embedding the dry toppings into a dough sheet during the sheeting line. Although the invention may be practiced at any roll stand of a dough sheeting line, the preferred method applies the dry toppings in the last roll stand of the sheeting line. Through the action of the roll pairs, the dry topping is embedded into the dough product. Although the dry topping is pressed into the dough sheet, the dry topping remains at the surface of the dough product. Then, when the dough product is baked, the dough expands causing the dry topping to emerge. The baked dough piece looks as if the dry topping was sprinkled on top of the dough product immediately before baking.

The invention also discloses a dough piece with dry topping applied on and embedded into a rolled or biscuit-like dough product in the sheeting line. Preferably, the dry topping is applied to the dough product in the last roll stand of the sheeting line. The amount of dry topping may be between about 0.1 to about 5.0 weight percent of the dough. Upon baking, the embedded dry topping emerges producing a dough piece with dry topping evenly distributed on the surface of both rolled and biscuit-like dough products.

DESCRIPTION OF THE PREFERRED EMBODIMENT

The present invention surprisingly discloses that embedding toppings into a refrigerated dough product during a sheeting line facilitates even distribution of the toppings onto the surface of the dough product. The novel embedding method expands the range of possible toppings to be applied on rolled dough products. Some possible toppings which may be used in the present invention are grains, seeds (sesame or poppy), nut pieces, and fabricated toppings (candy or synthetic nuts). In addition, the novel embedding method now allows for the application of dry toppings to biscuit-like dough products. The above mentioned toppings and also the fine and granular toppings previously applied on rolled dough products can now be applied to biscuit-like dough products.

Embedding the toppings into a dough product during the sheeting line produces a baked dough piece which looks as if the topping had been sprinkled on immediately prior to baking. The pressure exerted from a plurality of rolls in a roll stand embeds the toppings into a dough sheet. Although the invention may be practiced at any roll stand of a dough sheeting line, the preferred method applies the dry toppings in the last roll stand of the sheeting line. Throughout the subsequent cutting and packaging processes, the dry toppings remain embedded at the surface of the dough product. Unlike past methods, the dry toppings do not fall off or unevenly distribute on the surface of the dough product. Upon baking, the dough expands causing the dry toppings to emerge. The final rolled or biscuit-like dough piece has evenly distributed dry toppings on its entire surface.

The present invention may be practiced by applying the dry toppings through a topping applicator positioned along the sheeting line. Although the topping applicator may be positioned in any roll stand of a sheeting line, the preferred method positions the topping applicator in the last roll stand. Toppings from about 0.1 weight percent to about 5.0 weight percent may be applied to the dough product. However, the preferred range is from about 0.1 percent to about 2.0 percent by weight of the dough product.

Figure 1:
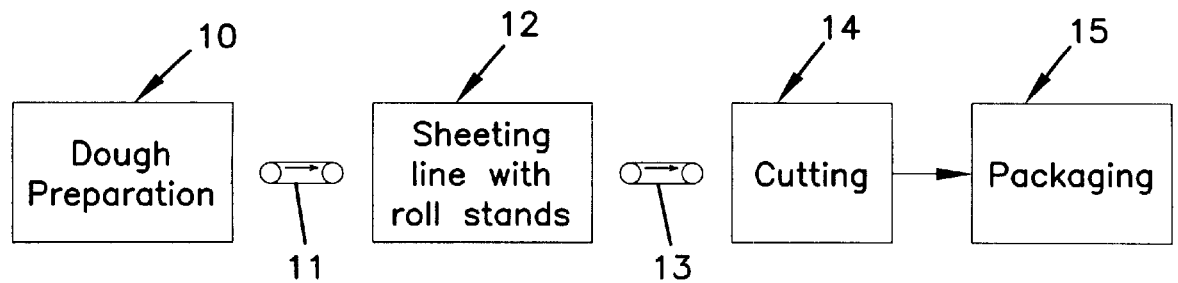
FIG. 1 is a schematic diagram illustrating a typical processing method for rolled and biscuit-like dough products.
Figure 2:
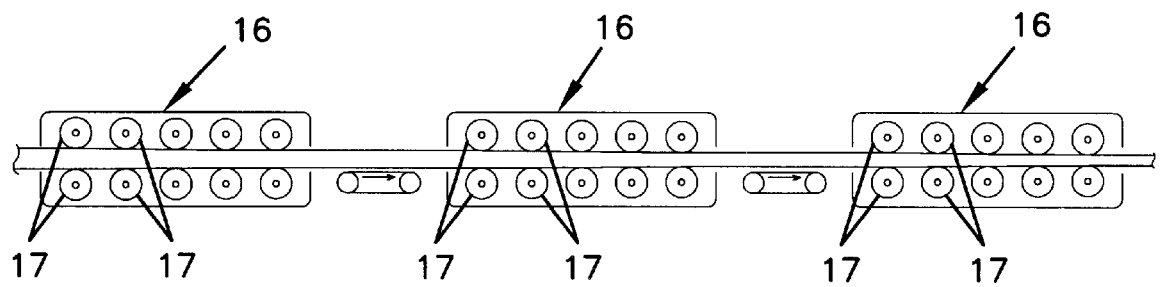
FIG. 2 is a schematic diagram illustrating a typical sheeting line.

The method of forming a dough piece with dry topping embedded into the dough product comprises the same general steps as illustrated in FIG. 1. As will be described below, the sheeting line process differs from prior methods. The first step includes the forming of a dough composition 10. Examples of some dough products suitable for the present invention are breadstuffs, biscuits and sweet goods. "Breadstuffs" include products such as breadsticks, breadtwists and loafs. "Sweet goods" include products such as danish rolls, cinnamon rolls, and coffee cakes. The following is a tabulation of the main ingredients in a typical dough composition, as disclosed in U.S. Pat. No. 4,381,315, incorporated herein by reference:

| Ingredient | Weight Percent of Dough |
| --- | --- |
| flours | 47–58 |
| water | 28–36.5 |
| saccharides | 4–10 |
| shortening | 2–25 |
| salt | 1.0–1.5 |

Optionally, the dough may also contain:

| Ingredient | Weight Percent of Dough |
| --- | --- |
| flavoring | 0.1–7.0 |
| emulsifiers | 0.02–1.1 |
| dough conditioners | 0.005–0.25 |
| bicarbonate of soda | 0.7–1.2 |
| leavening acid | 1.3–2.5 |

| Ingredient | Weight Percent of Dough |
| --- | --- |
| edible alcohol | 0–2 |
| calcium carbonate | 0–1 |

The dough product formed according to this formula is representative of known refrigerated dough formulas. "Refrigerated dough" means a dough composition suitable for storage for extended periods of time at a temperature at or below 50 degrees Fahrenheit.

The present invention extends to all dough products. It extends to chemically leavened dough products as well as yeast leavened dough products. The above dough composition is disclosed as an example of a chemically leavened dough product and is not intended to limit the scope of the present invention.

Certain ranges of ingredients are preferred. The preferred water content of the dough is between about 24 percent to about 31 percent by weight of the dough. The preferred flour content is between about 48 percent to about 54 percent by weight of the dough. The preferred shortening content is between about 2 percent to about 20 percent by weight of the dough.

The dough ingredients are mixed according to the most preferred method at ambient temperature and atmospheric pressure. Conveyor belt 11 then feeds the refrigerated dough product towards the sheeting line. The dry toppings are eventually applied to the dough product in the sheeting line.

Figure 3:
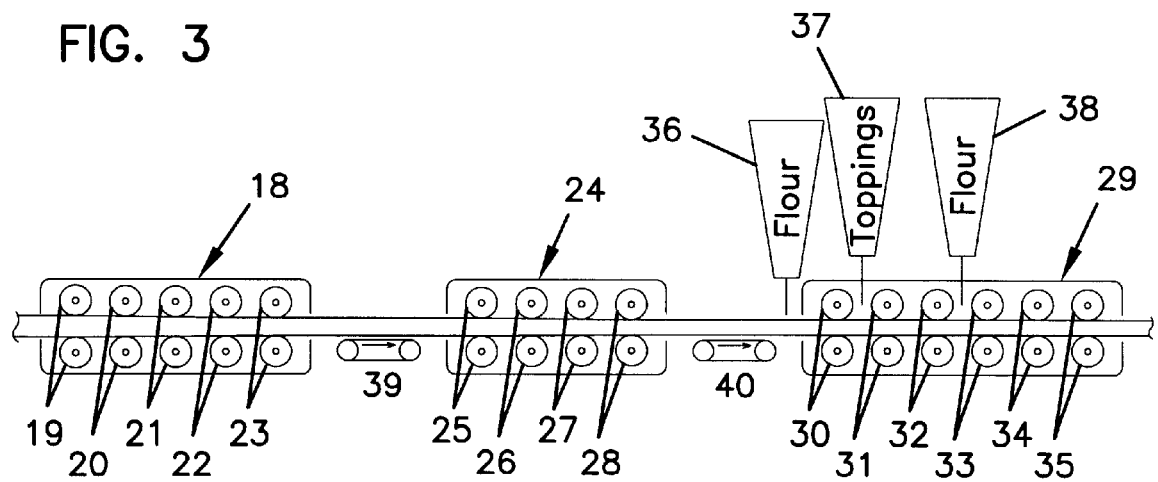
FIG. 3 is a schematic diagram illustrating the preferred sheeting line of the present invention.

FIG. 3 is a schematic diagram illustrating a preferred sheeting line of the present invention. The sheeting line consists of a plurality of roll stands 18, 24, 29. Roll stand 18 consists of a plurality of roll pairs 19, 20, 21, 22 and 23. Roll stand 24 consists of a plurality of roll pairs 25, 26, 27, and 28. Roll stand 29 consists of a plurality of roll pairs 30, 31, 32, 33, 34, and 35. Lappers may also be present between roll stands 18, 24, and 29. With the use of conveyor belts 39 and 40, the refrigerated dough products are transported through the various roll stands 18, 24, and 29.

As FIG. 3 illustrates, placed along the sheeting line are hoppers 36 and 38. Hoppers 36 and 38 provide the means by which a dusting flour may be applied to the dough product. The dusting flour prevents the dough product from sticking to the sheeting rolls. Although any flour may be used as the dusting flour, rice flour is preferred because its large starch granules help to facilitate separation of the dough pieces stored in contact with each other.

In the present invention, the dry toppings stick to a dough sheet and become embedded into the dough sheet. Thus, to facilitate sticking, the present invention minimizes the amount of dusting flour applied to the dough sheet.

Also positioned along the sheeting line is a topping applicator 37. Topping applicator 37 provides the means by which the dry topping may be applied to the dough product. An example of a topping applicator usable in accordance with the present invention is the dispensing machine sold under the trademark Christy® Dry Material Dispensing Machine. The Christy® machine is sold by Christy Machine Company of Fremont, Ohio.

The topping applicator 37, such as the Christy® Dry Material Dispensing Machine, controls the rate at which dry topping is applied to the dough product and the thickness of the dry topping. A dispensing shaft, rotating at the base of a V-shaped feed hopper, meters the flow of dry topping. The dispensing shaft rotates against nylon brushes or wipers which remove the excess dry topping. Agitators are linked to the movable interior walls of the hopper to assure continuous flow and reduce clogging of dry topping in the hopper.

U.S. Pat. Nos. 3,073,607 and 3,070,264 disclose examples of apparatus for dispensing dry materials onto various products. These patents are incorporated herein by reference.

Within the sheeting line, a dough sheet first travels through roll stands 18 and 24. As the dough sheet travels through each roll stand 18 and 24, it decreases in thickness forming a uniform dough sheet. If lappers are present between roll stands 18 and 24, the thickness of the dough sheet as it exits roll stand 18 will not equal the thickness of the dough sheet as it enters roll stand 24.

Next, a specified amount of dusting flour is added to the dough sheet through hopper 36. Although hopper 36 may be positioned in any roll stand along the sheeting line, the preferred method positions hopper 36 in front of roll pair 30 in the last roll stand 29. In the preferred method, dusting flour of an amount. up to about 0.1 weight percent of the dough is applied in hopper 36.

The dry toppings are then applied to the dough sheet. Although the dry toppings may be added anywhere in the sheeting line, preferably they are added in a last roll stand 29. Although the mechanism of the present invention is not completely known, it is believed that applying the dry toppings in the last roll stand results in a dough piece with the most evenly distributed dry topping. It is believed an earlier application results in a dough piece with dry toppings too embedded into the dough product. Whereas, as described above, applying the dry toppings after the last roll stand 29 results in a dough piece with less amount of dry toppings on the surface.

The dry toppings are applied to the dough product with the use of topping applicator 37. Although the topping applicator 37 may be positioned anywhere in the sheeting line, the preferred method positions the topping applicator 37 in the last roll stand 29. Preferably, the topping applicator 37 is positioned between hoppers 36 and 38 in the last roll stand 29. Dry toppings of anywhere from about 0.1 weight percent to about 5.0 weight percent may be applied to the dough product. However, the preferred range is from about 0.1 percent to about 2.0 percent by weight of the dough product.

After the dry toppings are applied, additional dusting flour may be added with the use of hopper 38. Hopper 38 is positioned in the middle of the last roll stand 29. In the preferred method, dusting flour of an amount up to about 1.0 weight percent is applied to the dough product. However, the amount of dusting flour applied does depend on the particular type of dough product used. In general, with rolled dough products, a greater amount of dusting flour may be applied in hopper 38.

The dough sheet covered with dry toppings then travels through the remaining roll pairs 33, 34, and 35 of the last roll stand 29. The pressure applied in the remaining roll pairs embeds the dry toppings into the dough sheet. Although the dry toppings are pressed into the dough sheet, the dry toppings remain at the surface of the dough product.

The thickness of the dough sheet as it exits the sheeting line varies depending on factors including dough wetness, dough temperature, and sheeting line time. The thickness of a rolled dough product may range from about 0.3 to about 1.0 inches. Preferably, the thickness of a rolled dough product ranges from about 0.4 to about 0.6 inches. Similarly, the thickness of a biscuit-like dough product can range from about 0.15 to about 1.0 inches. The preferred thickness range for a biscuit-like dough product is between about 0.2 to about 0.4 inches. These ranges are not intended to limit the scope of the present invention. Rather, they are illustrative in nature.

Depending on the type of dough product (rolled or biscuit-like), the dough product is then cut and packaged according to conventional methods for that type. With rolled dough products, after the dry topping is applied, the dough sheet is cut into rectangular dough pieces. Then, the dough pieces are rolled into cylindrical shapes. In the present invention, the dry toppings on the rolled dough products do not fall off nor unevenly distribute themselves on the surface of the dough product. Rather, the dry toppings are securely embedded into the dough product.

With biscuit-like dough products, a plunger is used to hold and release the biscuit-like dough piece into a container. In the present invention, the vacuum in the plunger does not pull off the dry toppings nor do the dry toppings clog the various plungers. Instead, the dry toppings remain embedded at the surface of the dough product.

Finally, as the dough expands upon baking, the dry toppings are pushed up to the surface. The dry toppings become well defined, as though they were sprinkled on the top before baking. Surprisingly, the embedding of dry toppings in the sheeting line produces a baked dough piece with evenly distributed dry toppings on the surface of a baked dough product.

Although the present invention has been described with reference to preferred embodiments, workers skilled in the art will recognize that changes may be made in form and detail without departing from the spirit and scope of the invention.

What is claimed is:

1. A method for preparing a refrigerated biscuit dough product having a topping embedded in the dough, which comprises:
    (a) predusting a surface of a fully sheeted dough;
    (b) applying dry toppings, said toppings selected from the group consisting of grains, seeds, nut pieces, candy, and synthetic nuts, on the predusted surface of a fully sheeted dough in a sheeting line and embedding the toppings through the direct application of pressure by roll pairs onto the topping in the sheeting line;
    (c) cutting the dough to form individual dough pieces having dry toppings embedded on the surface; and
    (d) packing the dough pieces into a container using a plunger which holds and releases the individual dough piece into the container using a vacuum or pressure, whereby said dough is suitable for storage at refrigerated temperatures to provide a plunger packed refrigerated biscuit dough product.

2. The method of claim 1 wherein the sheeting line comprises a series of roll stands and the toppings are applied on and embedded into the surface of the refrigerated dough in the last roll stand of the sheeting line.

3. The method of claim 1 wherein the amount of toppings ranges between about 0.1 to about 5.0 weight percent of the surface of the refrigerated dough piece.

4. The method of claim 1 wherein the refrigerated dough piece contains:
    (a) a flour blend in the amount between about 48 percent to 54 percent by weight of dough;
    (b) shortening in an amount between about 2 to about 20 percent by weight of dough;
    (c) water in an amount between about 24 to about 31 percent by weight.

5. A vacuum or pressure plunger packed refrigerated biscuit dough piece with toppings applied on and embedded into the surface of the dough piece prepared in accordance with the method of claim 1.

6. A vacuum or pressure plunger packed refrigerated biscuit dough piece with toppings applied on and embedded into the surface of the dough piece prepared in accordance with the method of claim 2.

7. A method for preparing a refrigerated dough product having a topping embedded in the dough, which comprises:
    (a) predusting a surface of a fully sheeted dough;
    (b) applying dry toppings onto the predusted surface of the dough in a sheeting line and embedding the dry toppings into the dough through the direct application of pressure by roll pairs onto the dry topping;
    (c) cutting the dough to form individual dough pieces having a dry toppings embedded therein; and,
    (d) packing the individual dough pieces into a container using a plunger which holds dough and releases pieces into the individual container using a vacuum or pressure whereby said dough is suitable for storage at refrigerated temperatures to provide a plunger packed refrigerated biscuit dough product.

8. The method of claim 7 wherein the toppings are applied on and embedded into the surface of the refrigerated dough product in the last roll stand of the sheeting line.

9. The method of claim 7 wherein the dry toppings are selected from the group consisting of grains, seeds, nut pieces and fabricated toppings.

10. The method of claim 7 wherein the amount of toppings ranges between about 0.1 to about 5.0 wt-% of the refrigerated dough piece.

11. The method of claim 7 wherein the refrigerated biscuit dough piece contains:
    (a) a flour blend in an amount between about 48% to 54% by weight;
    (b) shortening in an amount between about 2% to about 20% by weight; and
    (c) water in an amount between about 24% to about 31% by weight.

12. A vacuum or pressure plunger packed a refrigerated biscuit dough piece with toppings applied on and embedded into the surface of the dough piece prepared in accordance with the method of claim 7.

* * * * *

UNITED STATES PATENT AND TRADEMARK OFFICE
CERTIFICATE OF CORRECTION

PATENT NO. : 6,004,595
DATED : DECEMBER 21, 1999
INVENTOR(S): RAY ET AL.

It is certified that error appears in the above-identified patent and that said Letters Patent is hereby corrected as shown below:

Col. 6, line 16: delete "." after the word "amount"

Col. 7, line 8: "nor" should read --or--

Col. 8, line 20, claim 7: "onto the" should read --onto a--

Col. 8, line 25, claim 7: "toppings" should read --topping--

Col. 8, line 50, claim 12: delete "a" after the word "packed"

Signed and Sealed this

Seventeenth Day of April, 2001

*Attest:*

NICHOLAS P. GODICI

*Attesting Officer*     Acting Director of the United States Patent and Trademark Office